No. 896,778. PATENTED AUG. 25, 1908.
T. J. UNDERWOOD.
MACHINE FOR MAKING BATS FOR MATTRESSES, PILLOWS, COMFORTS, &c.
APPLICATION FILED SEPT. 17, 1907.
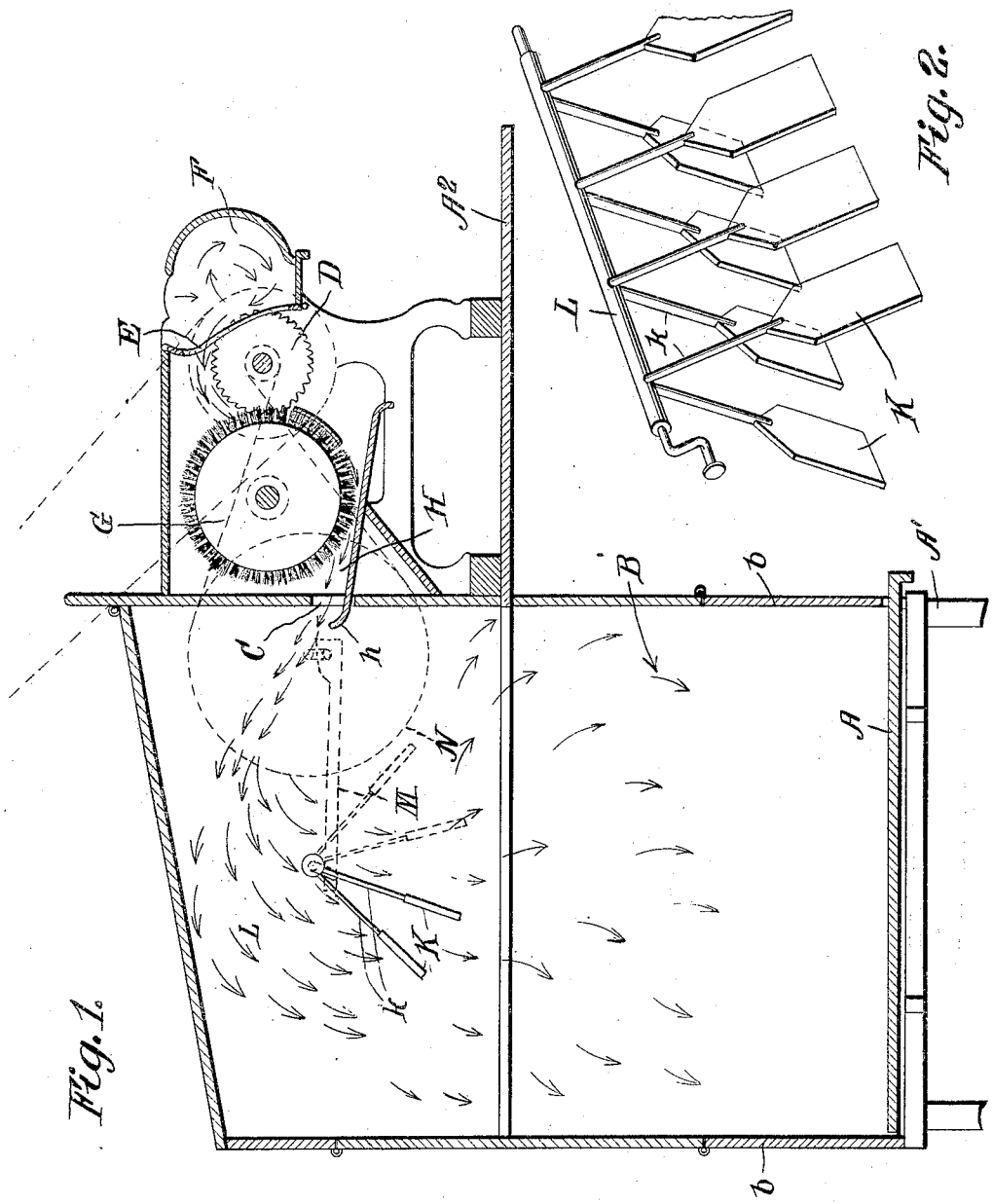

UNITED STATES PATENT OFFICE.

THOMAS J. UNDERWOOD, OF SEALY, TEXAS.

MACHINE FOR MAKING BATS FOR MATTRESSES, PILLOWS, COMFORTS, &c.

No. 896,778.   Specification of Letters Patent.   Patented Aug. 25, 1908.

Application filed September 17, 1907. Serial No. 393,383.

*To all whom it may concern:*

Be it known that I, THOMAS J. UNDERWOOD, of Sealy, county of Austin, and State of Texas, have invented certain new and useful Improvements in Machines for Making Bats for Mattresses, Pillows, Comforts, &c.; and I do hereby declare the following to be a full, clear, and exact description of the same, reference being had to the accompanying drawings, forming a part of this specification, and to the figures and letters of reference marked thereon.

This invention relates to the type of bat forming machines set forth in the patent to D. Haynes No. 399,041 the object of the invention being to provide a machine which will give better and more uniform results, be capable of operating at a higher speed and of successfully handling widely different grades of bat forming material.

In the accompanying drawings, Figure 1 is a sectional elevation of a machine embodying the present improvements, certain of the parts being shown in dotted lines. Fig. 2 is a perspective view of the fan.

In said drawings A indicates a platform, preferably movable and upon which the material is deposited to form the bat.

Extending above the platform is a bat chamber or compartment B the walls of which have the usual doors or movable sections such as indicated at $b$ and at one side near the top an entrance opening C for the bat forming material. The chamber is preferably of considerable height to afford ample opportunity for the even distribution of the material as it falls to the platen and hence it is convenient to locate the platen on a stand or other supporting means A' while the mechanism for discharging the material into the chamber is located on and above a higher platform or floor $A^2$ as will be readily understood from Fig. 1.

The mechanism for disintegrating and forcing or blowing the material into the chamber conforms somewhat in general characteristics to a cotton gin, that is to say it has a saw drum D, the teeth of the saws being filed blunt however to pick up and separate the fibers of lint cotton without choking down. A series of ribs E loose at the upper ends to permit them to oscillate are arranged with one rib between each two saws at the front and the lint cotton chamber F forward of the saws and ribs is made of rounding or cylindrical shape whereby a roll of cotton may form in it which will turn and adjust itself to the saws to insure an even feed to the bat chamber even though the supply of lint cotton be irregular. In rear of the saw drum is a brush cylinder G of relatively large diameter having approximately twice the number of rows of bristle tufts commonly employed in cotton gins and geared to run at a much higher speed than is necessary in ginning cotton. A duct or flue H extends under the saws and brush and to the entrance opening C of the bat chamber, the bottom wall of said flue being directed in an upwardly inclined direction at the end as indicated at $h$ to throw the disintegrating fiber over to the central part of the chamber from which point it will be evenly distributed on the platform in both directions.

To insure the even distribution of the disintegrated or non-coherent fiber thrown into the chamber by the brush and for creating tremulous air currents which will cause the disintegrated fiber to felt and knit together in a uniform bat such as will hold together when placed in a ticking even without tufting; the oscillating fan is not pivoted at the side of the chamber as in the Haynes patent before referred to but is pivotally hung from an axis at about the center of the upper part of the chamber.

As shown in the drawings the oscillating fan preferably consists of two series of blades K set at an angle to each other and connected by relatively small stems $k$ with a shaft L mounted in bearings in the walls of the chamber and adapted to be oscillated by a connecting rod M extending from a crank on the shaft to a crank on a pulley or gear N of relatively large size and belted to a pulley on the saw shaft.

Obviously any usual or preferred form of drive gearing may be employed for the various rotary members, but while the brush rotates at high speed, the fan should oscillate at a lower speed and its range of movement should be regulated to prevent any irregular piling up of the fiber on the platen.

In operation the fiber is blown into the chamber in a thoroughly disintegrated condition, the upward turn of the entrance duct causing the same to shower into the chamber, centrally, that is to say the center of the chamber parallel with the entrance opening is approximately the center of the body of falling fiber and the oscillatory fan not only insures a uniform distribution of the fiber in the lower part of the chamber over the whole platen but the tremulous or back and forth air currents set up by the fan cause the fiber to felt together as it settles and insures the formation of a perfect and coherent bat, the action of the fan in this respect being quite different from a rotary device which latter sets up currents of air and maintains them in one direction at any given point.

Having thus described my invention, what I claim as new and desire to secure by Letters Patent is,

1. In an apparatus for forming fiber bats, the combination with the bat chamber, of means for disintegrating and blowing the disintegrated fiber into the upper part of the chamber, an oscillatory fan hung within the chamber with its axis located in the path of the falling fiber and means for oscillating said fan.

2. In an apparatus for forming fiber bats, the combination with the bat chamber and means for disintegrating and blowing the disintegrated fiber into the chamber, an upwardly directed entrance duct leading into the bat chamber, of an oscillatory fan suspended within the chamber with its axis in the path of the falling fiber whereby the opposite faces of the fan are alternately active in directing the distribution of the fiber to the lower portion of the chamber.

3. In an apparatus for forming fiber bats, the combination with the bat chamber and means for blowing disintegrated fiber into the upper part thereof, of an oscillating fan embodying a shaft extending across the upper part of the bat chamber, and a plurality of broad blades arranged at an angle to each other and carried by the shaft.

4. In an apparatus for forming fiber bats, the combination with the bat chamber, of a disintegrating and blowing mechanism embodying a substantially cylindrical lint cotton chamber, blunt toothed saws at one side of said chamber, ribs between the saws, a high speed relatively dense brush coöperating with the saws to remove the fiber and after removal to blow the same into the bat chamber, an upwardly directed duct extending under the saws and brush and leading into the bat chamber and an oscillating fan located within the bat chamber in the path of the falling fiber.

THOMAS J. UNDERWOOD.

Witnesses:
G. W. DONALSON,
D. FRANK CARDEN.